United States Patent [19]
Kitano

[11] 3,811,037
[45] May 14, 1974

[54] DIGITAL DATA CORRECTOR

[75] Inventor: Akira Kitano, Nagoya, Japan

[73] Assignee: Nippondenso Co., Ltd., Aichi-ken, Japan

[22] Filed: July 5, 1972

[21] Appl. No.: 269,141

[30] Foreign Application Priority Data
July 7, 1971 Japan.............................. 46-50102

[52] U.S. Cl........... 235/152, 235/150.2, 235/150.21
[51] Int. Cl............................ G06f 1/02, G06f 15/50
[58] Field of Search.............. 235/152, 150.2, 150.21

[56] References Cited
UNITED STATES PATENTS

| | | | |
|---|---|---|---|
| 3,633,017 | 1/1972 | Crooke et al................... | 235/152 X |
| 3,700,868 | 10/1972 | Silvertson .......................... | 235/152 |
| 3,689,753 | 9/1972 | Williams et al................ | 235/150.21 |
| 3,689,755 | 9/1972 | Hodgson et al................ | 235/150.21 |
| 3,679,879 | 7/1972 | Seki et al........................... | 235/152 |
| 3,662,160 | 5/1972 | Hoppes........................... | 235/152 X |

Primary Examiner—Malcolm A. Morrison
Assistant Examiner—James F. Gottman
Attorney, Agent, or Firm—Cushman, Darby & Cushman

[57] ABSTRACT

In a system for correcting digital data, a first register for storing a basic digital input and a second register for storing one or a plurality of corrective digital inputs are provided. A program section including said second register samples digital program data according to a predetermined program in response to the corrective digital inputs stored in the second register and a data selector picks up digital program data corresponding to the basic digital input from among the digital program data sampled by the program section, wherein the digital program data picked up by the data selector is added to the basic digital input.

2 Claims, 11 Drawing Figures

DIGITAL DATA CORRECTOR

BACKGROUND OF THE INVENTION

1. Field Of The Invention

This invention relates to a digital data correcting system for correcting a basic input by means of one or a plurality of digitized corrective inputs in the event that an adequate output is not obtained by the mere application of a digitized basic input to, say, an electronic fuel injection system.

2. Description Of The Prior Art

In a conventional electronic fuel injection system, the quantity of basic input of a negative engine pressure is corrected according to a predetermined function in such a manner that both the negative engine pressure of the basic input and the corrective inputs including engine speed, engine temperature and suction air temperature are converted into analog voltages and such operations as addition, subtraction and multiplication are performed analogically.

In such an analogical system, the more complicated are the functions for correction, the more operating processes are necessary. Also, a more complicated structure and a larger size of the system results in a higher cost.

SUMMARY OF THE INVENTION

Accordingly, it is an object of this invention to obviate the above-mentioned disadvantages of the conventional electronic fuel injection system by providing a low-cost, compact digital data correcting device with a simple structure which is capable of all digital calculating operations.

DESCRIPTION OF THE PREFERRED EMBODIMENTS

Figure 1:
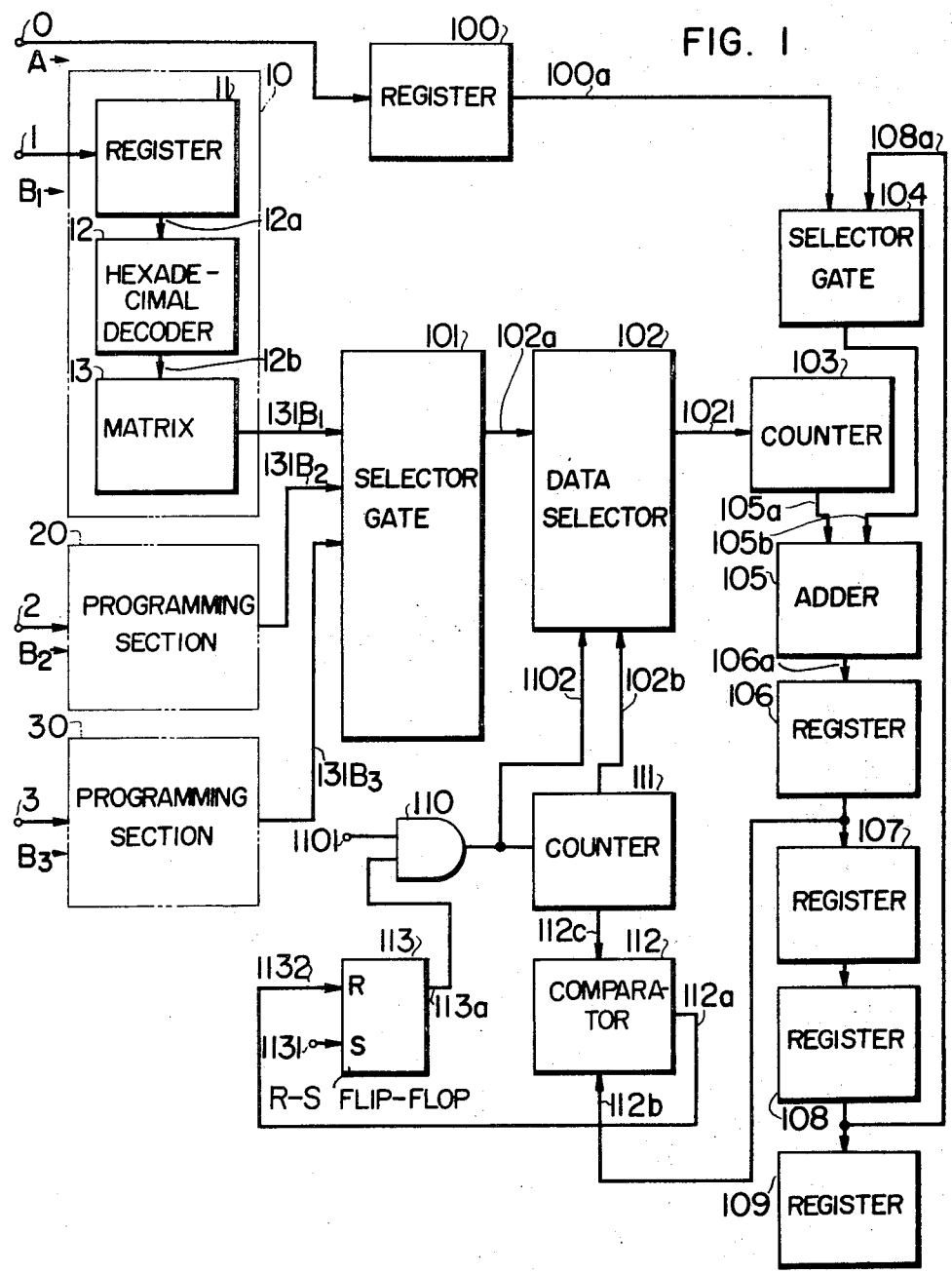
FIG. 1 is a block diagram showing the digital data correcting device embodying the present invention.

Explanation will be made now of an embodiment of the invention with three corrective inputs with reference to FIG. 1. In this figure, the reference numeral 0 shows an input terminal to which is applied the basic input A of a digital quantity, for example, corresponding to the negative engine pressure required for an electronic fuel injection system, and numerals 1, 2 and 3 input terminals to which are applied corrective inputs $B_1$, $B_2$ and $B_3$ respectively representing, for example, the digital quantities of engine speed, engine temperature and suction air temperature required for the electronic fuel injection system. The numeral 100 shows a register comprising a well-known latch circuit employing a flip-flop for memorizing the digital quantity of the basic input in the form of a binary number and generating signals at the output terminal 100a. The numerals 10, 20 and 30 show programming sections for sampling the digital program data therein responsive to the digital quantities of corrective inputs $B_1$, $B_2$ and $B_3$ respectively according to a predetermined program, which determines the digital quantity to be corrected of the basic input A or corrected basic input depending upon the corrective inputs. The Numeral 101 shows a selector gate for sequentially applying to the input terminal 102a of the data selector 102 those program data of corrective inputs $B_1$, $B_2$ and $B_3$ applied to the input terminals $131B_1$, $131B_2$ and $131B_3$ respectively in response to an externally designated signal. The numeral 103 shows a counter circuit for performing a binary counting of pulses from the output terminal 1021 of the data selector 102, and the output of the counter circuit 103 is applied to the input terminal 105a of the adder circuit 105. The numeral 104 shows a selector gate for selecting the basic input A and the output of register 108, and this selector gate 104 applies a binary number stored in register 100 to the input terminal 105b of the adder circuit 105 only when calculating operations are conducted for the first corrective input $B_1$, while the gate logics of the selector 104 are such that the binary number stored in the register 108 is applied to the input terminal 105b of the adder circuit 105 when calculating operations are performed for the second and subsequent corrective inputs $B_2$ and $B_3$. The adder circuit 105 is provided for the purpose of adding the binary-number inputs applied to the input terminals 105a and 105b, the binary output of which is applied to the register 106. The binary-number output of the register 106 is applied in turn to the register 107 and converter 112. The binary-number output of the register 107 is applied to the register 108, the binary output of which is applied to the register 109 and selector gate 104. Each of the above-mentioned registers 106, 107, 108 and 109 consist of a well-known latch circuit. To one input terminal 112b of the comparator 112 are applied the output C of the register 106 and to the other input terminal 112c of the comparator 112 the output D of the counter circuit 111. These two inputs are compared with each other and if $C \leq D$, a signal "H" of a high level is produced at the output terminal 112 a connected to the reset input terminal 1132 of the R-S flip-flop 113. When a high-level pulse H from a not-shown reference pulse generator is applied to the set input terminal 1131 of the R-S flip-flop 113, the R-S flip-flop 113 is set in operation, thereby producing a high-level signal H at its output terminal 113a, which signal causes the AND gate 110 to be opened, while on the other hand the arrival of a high-level signal H at the reset input terminal 1132 causes a low-level signal L to be produced at the output terminal 113a, whereby the AND gate 110 is closed.

The output of the AND gate 110 is applied to the counter circuit 111 and the stroboscopic terminal 1102 of the data selector 102. While the AND gate 110 is opened, continuous pulses of given frequencies arrive at the input terminal 1101 of AND gate 110 in such a manner that a multiplicity of pulses pass the gate 110 during the time when the high-level signal H is applied to the output terminal 113a. The output terminal of the counter circuit 111 is connected not only to the input terminal 112c of the comparator 112 but to the data selecting input terminal 102b of the data selector 102. The counter 111 counts the multiplicity of pulses received from the gate 110 and generates the binary coded signal showing the count at the terminals 112 and 102b.

Figure 2:
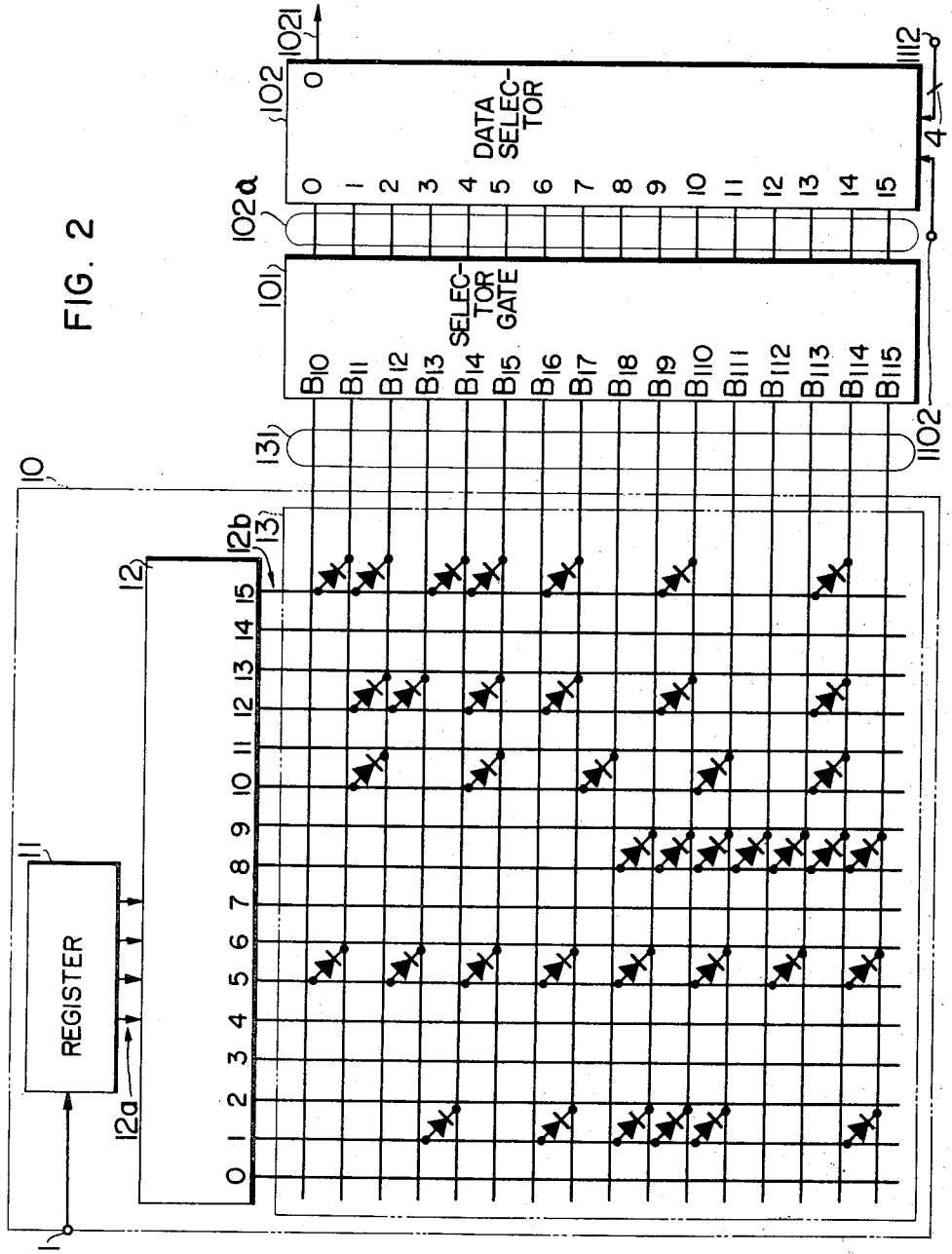
FIG. 2 is a block diagram showing the essential parts of the digital data correcting device illustrated in FIG. 1.

The programming section 10 as a representative example of the programming sections 10, 20 and 30 shown in FIG. 1, the selector gate 101 and the data selector 102 are shown in FIG. 2, which also illustrates the matrix section 13 in a programmed state and a hexadecimal decoder of a binary code designated by numeral 12.

Figure 7:
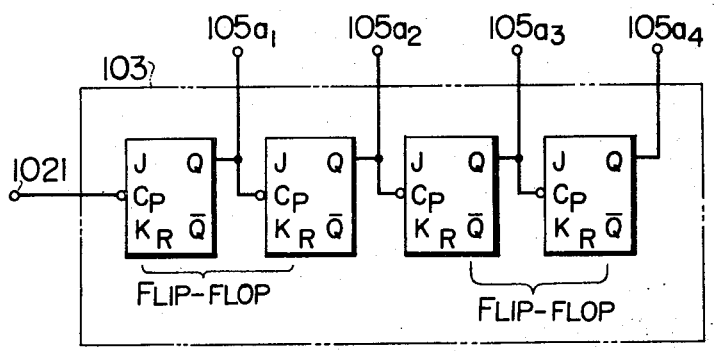
FIG. 7 is an electrical circuit diagram showing the counter circuit illustrated in FIG. 1.
Figure 4:
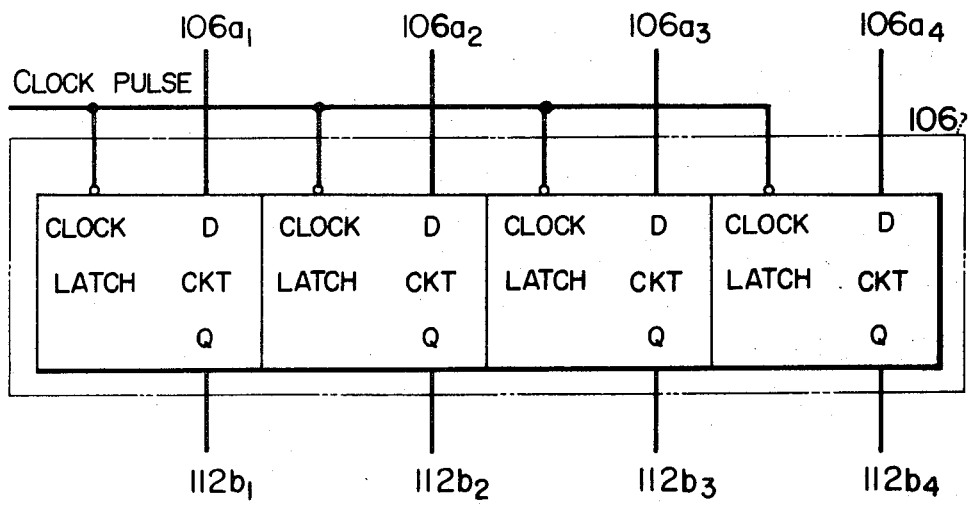
FIG. 4 shows a latch circuit constituting the register of FIGS. 1 and 2.
Figure 5B:
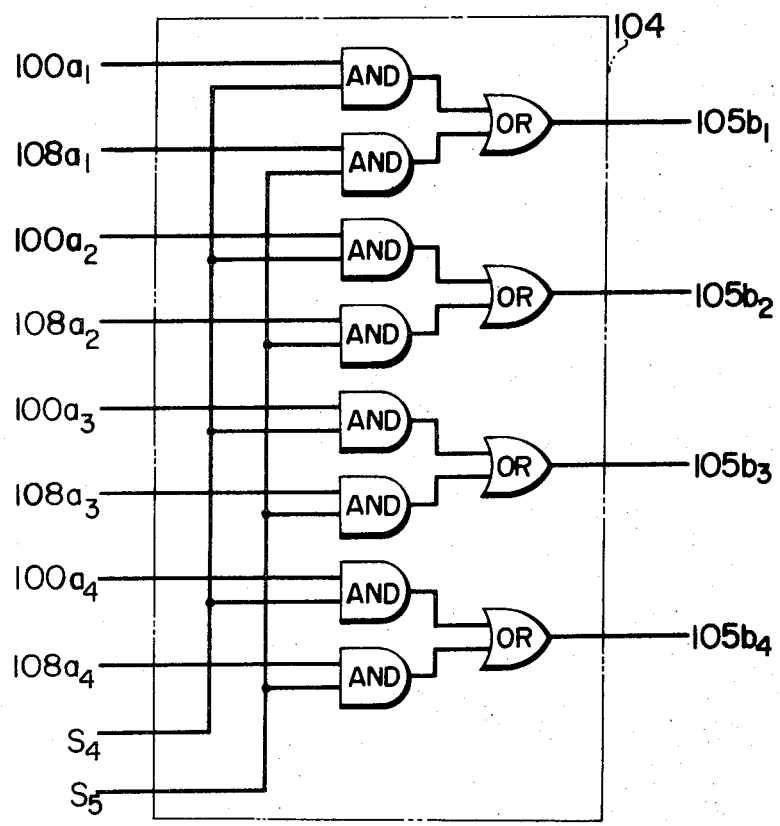
FIGS. 5a and 5b are electrical circuit diagrams showing the selector gates illustrated in FIGS. 1 and 2.
Figure 5A:
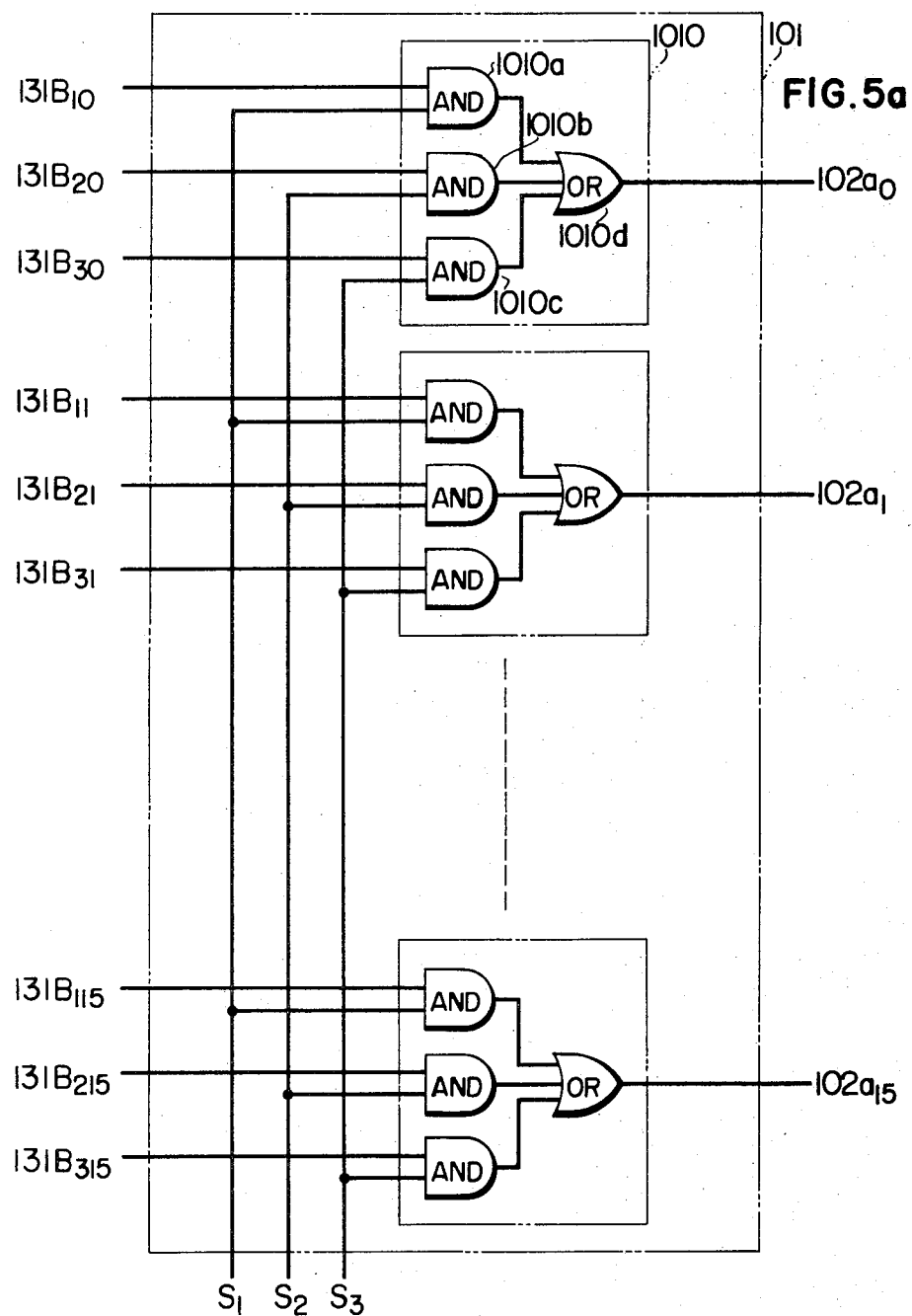
Figure 6:
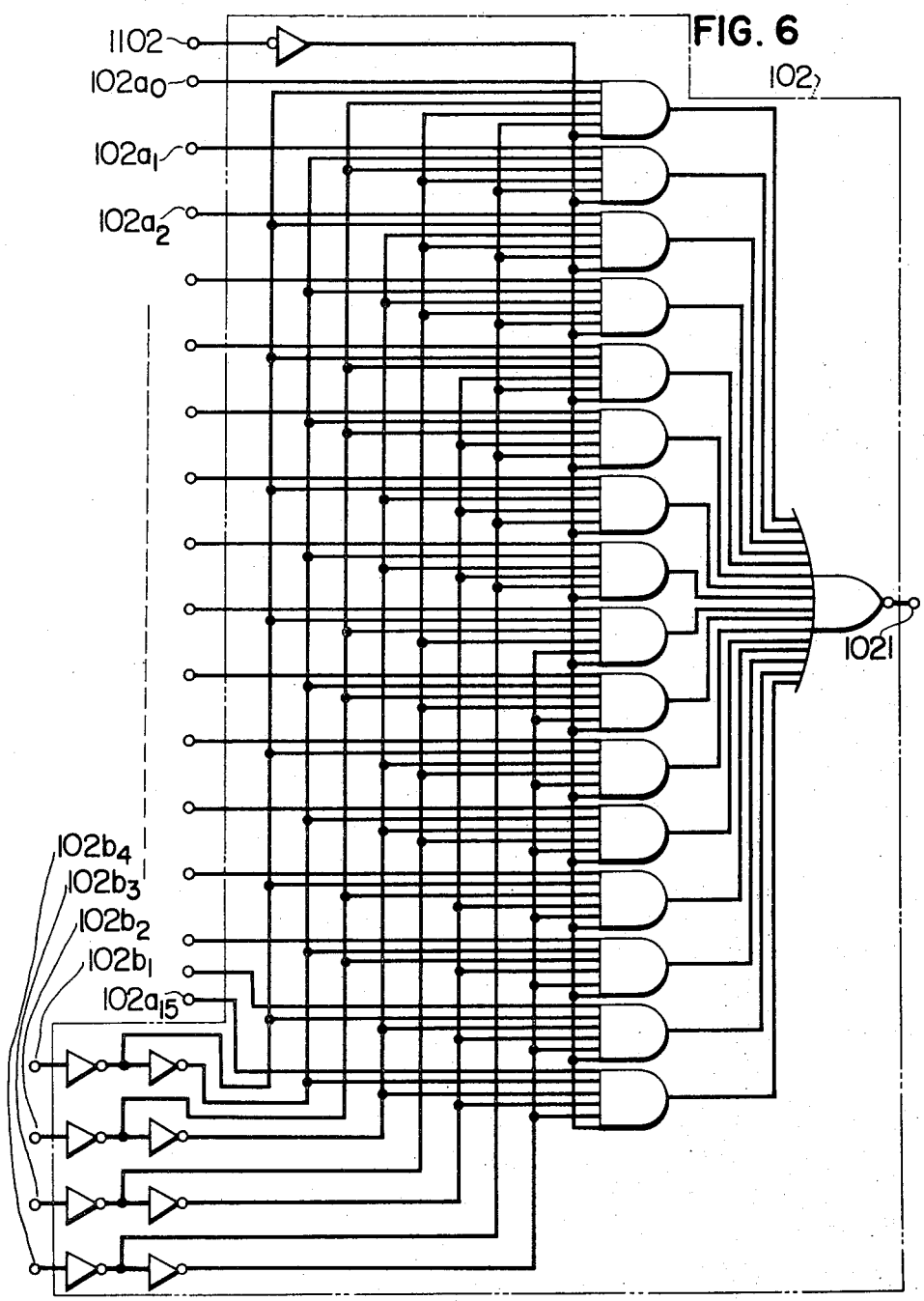
FIG. 6 is an electrical circuit diagram showing the data selector included in FIGS. 1 and 2.
Figure 8:
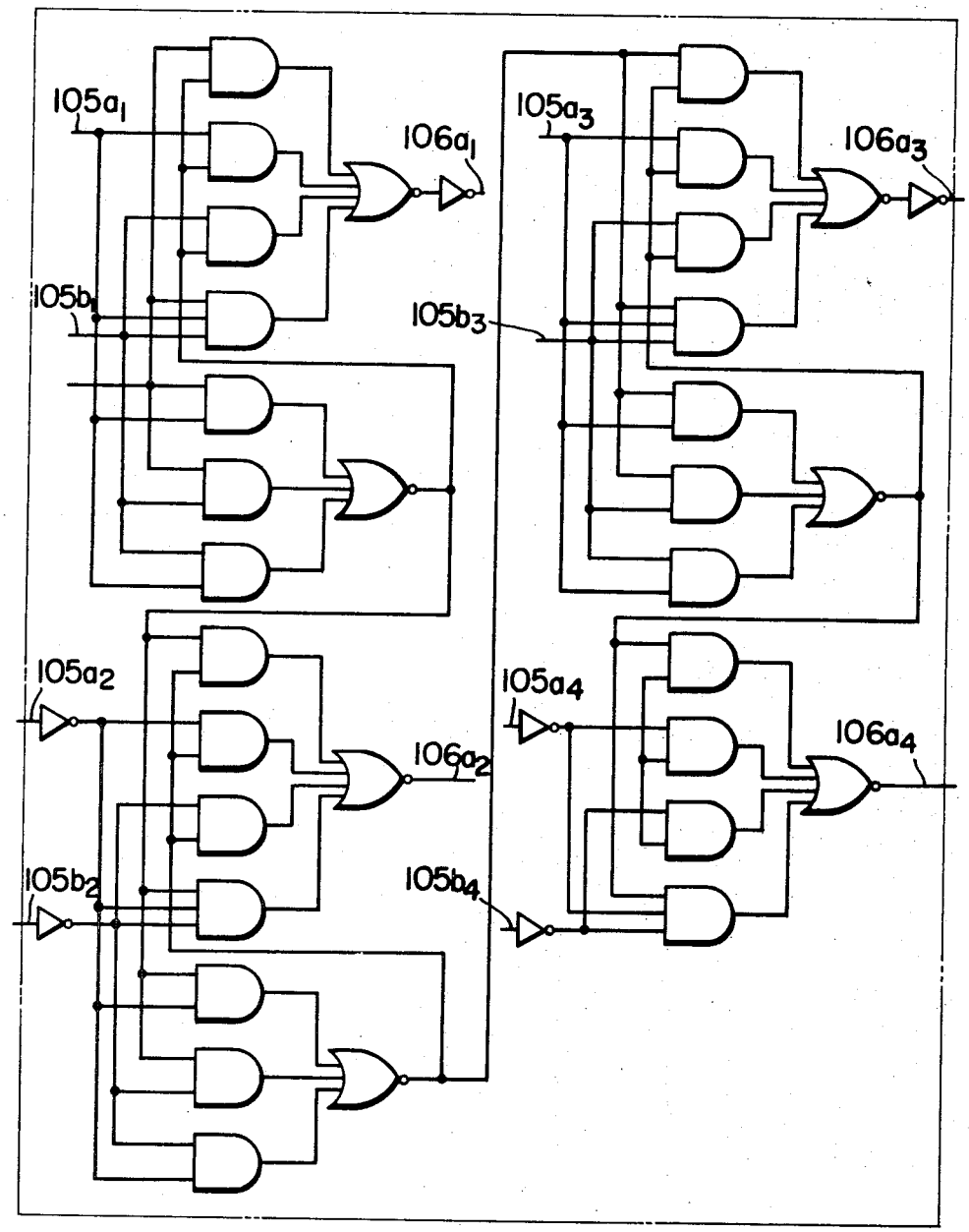
FIG. 8 is an electrical circuit diagram showing the adder circuit included in FIG. 1.
Figure 9:
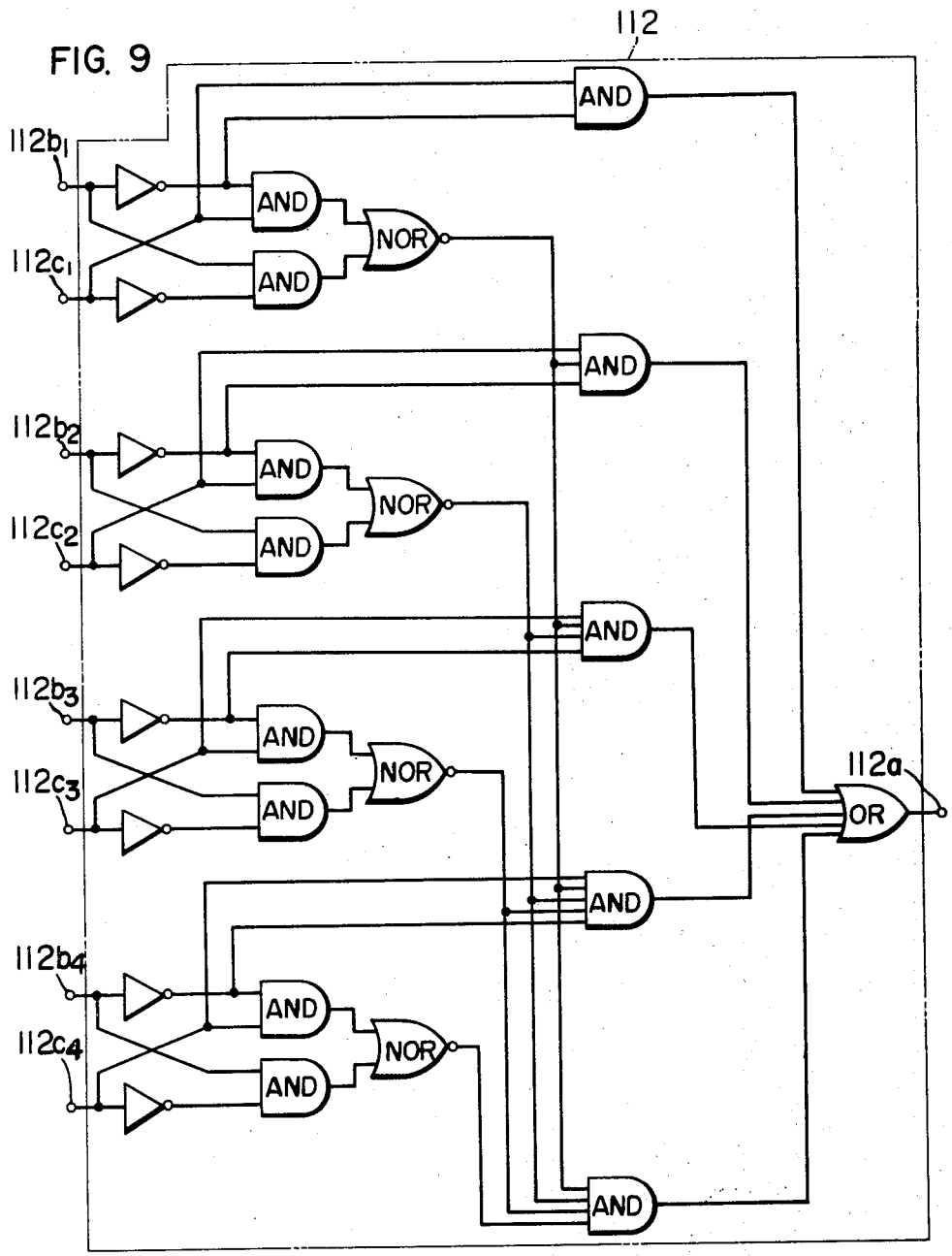
FIG. 9 is an electrical circuit diagram showing the comparator illustrated in FIG. 1.
Figure 10:
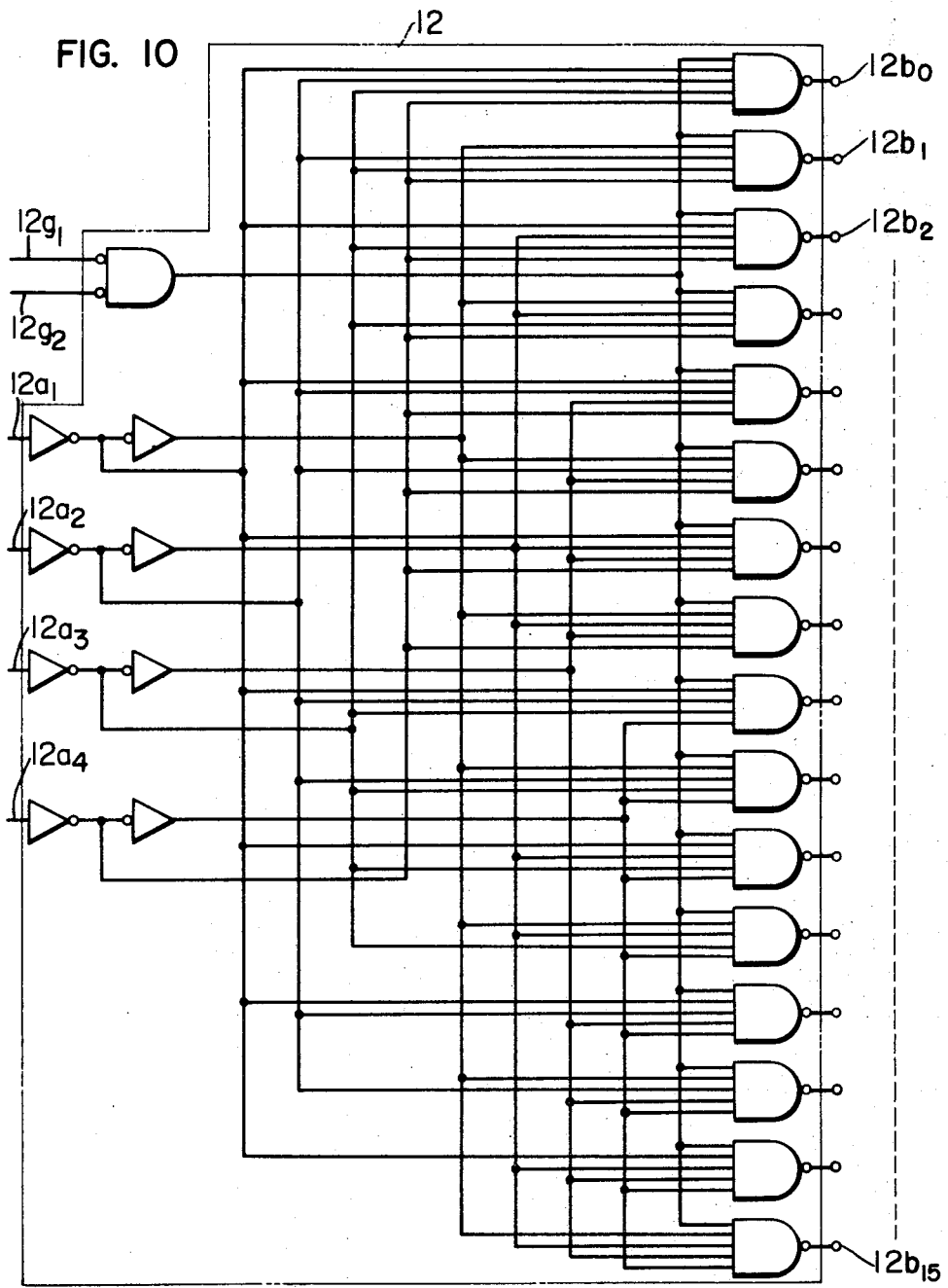
FIG. 10 is an electrical circuit diagram showing the hexadecimal decoder of binary codes illustrated in FIG. 2.

Certain components of the circuit shown in the block diagram of FIGS. 1 and 2 are illustrated more in detail in FIGS. 4 and 10. The register 106 consists of the latch circuit (shown in FIG. 4) or CIRCUIT TYPE SN5475N made by Texas Instruments. So are the other registers 100, 107, 108, 109 and 11. When a clock pulse is applied to the clock terminal, a signal applied to each of the D terminals ($106a_1$ to $106a_4$) is stored and generated from each of the Q terminals ($112b_1$ to $112b_4$) until a next clock pulse is applied. The selector gate 101 is the same as that shown in FIG. 5a, which comprises sixteen parallel selector gate portions 1010 including three AND gates 1010a, 1010b and 1010c and the OR gate 1010d. The output signal from the programming section 10 is applied to the input terminals $131B_{10}$, $131B_{11}$, $131B_{12}$ ....., $131B_{115}$, while the output signals from the programming sections 20 and 30 are applied to the input terminals $131B_{20}$, $131B_{21}$, $131B_{22}$, ..... $131B_{215}$ and $131B_{30}$, $131B_{31}$, ..... $131B_{315}$ respectively. Further, when a selecting input signal for selecting the programming sections 10, 20 or 30 is applied sequentially to input terminals $S_1$, $S_2$ or $S_3$, output signals corresponding to the output signals of the programming sections 10, 20 and 30 respectively are delivered from 16 terminals $102a_0$, $102a_1$, $102a_2$, ..... $102a_{15}$. The remaining selector gate 104 shown in FIG. 5b is almost the same in construction as the selector gate 101. When a signal from each of input terminals $S_4$ and $S_5$ is applied sequentially, the output signals corresponding to the output signal of the registers 100 and 108 respectively are delivered from four terminals $105b_1$, $105b_2$, $105b_3$ and $105b_4$. The data selector 102 which is shown in detail in FIG. 6 is provided with sixteen input terminals $102a_0$, $102a_1$, $102a_2$, ..... $102a_{15}$, to which are applied the signals from the selector gate 101, respectively. The output signal from the counter circuit 111 is applied to the data selecting terminals $102b_1$, $102b_2$, $102b_3$ and $102b_4$, while the output signal from the AND gate 110 is applied to the input stroboscopic terminal 1102, so that an output signal is obtained from the output terminal 1021. For this purpose, the CIRCUIT TYPE SN54150 made by Texas Instruments available on the market is used. The above-mentioned counter circuit 103, as shown in FIG. 7, comprises the four J-K flip-flops for counting the signal from the terminal 1021 and producing a signal indicating the count at output terminals $105a_1$, $105a_2$, $105a_3$, and $105a_4$. This counter circuit is the same as the circuit 111, both of which are well known. The adder circuit 105, as shown in FIG. 8, is composed of 4-bit adder circuits, in which the output signal of binary code from the counter circuit 103 is applied to the four input terminals $105a_1$, $105a_2$, $105a_3$ and $105a_4$, while a selection signal from the selector gate 104 is applied to the four input terminals $105b_1$, $105b_2$, $105b_3$ and $105b_4$. This adder circuit 105 consists of CIRCUIT TYPE SN5483 made by Texas Instruments of U.S.A. The comparator 112 is as shown in FIG. 9, in which the output signal from the register 106 is applied to the four input terminals $112b_1$, $112b_2$, $112b_3$ and $112b_4$, while the output signal from the counter circuit 111 is applied to the four input terminals $112c_1$, $112c_2$, $112c_3$ and $112c_4$. This is a digital comparator CIRCUIT TYPE SN54L85 of Texas Instrument of U.S.A. generally available on the market. The hexadecimal decoder 12 of the binary code is shown in FIG. 10, in which the output signal of register 11 is applied to the 4 input terminals $12a_1$, $12a_2$, $12a_3$ and $12a_4$, while at the same time the gate signal is applied to the gate terminals $12g_1$ and $12g_2$ for opening the gate to perform the decoding operation, so that the output signals from the 16 output terminals $12b_0$, $12b_1$, $12b_2$, ....., $12b_{15}$ are applied to the matrix section 13. This hexadecimal decoder 12 is CIRCUIT TYPE SN54154 made by Texas Instruments in U.S.A.

Explanation will be made now of the operation of the system according to the invention with the above-mentioned construction. Although the basic input A and corrective inputs $B_1$, $B_2$ and $B_3$ are of digital quantities and all calculating operations are performed digitally, they will be treated here as binary inputs for convenience of illustration.

Figure 3:
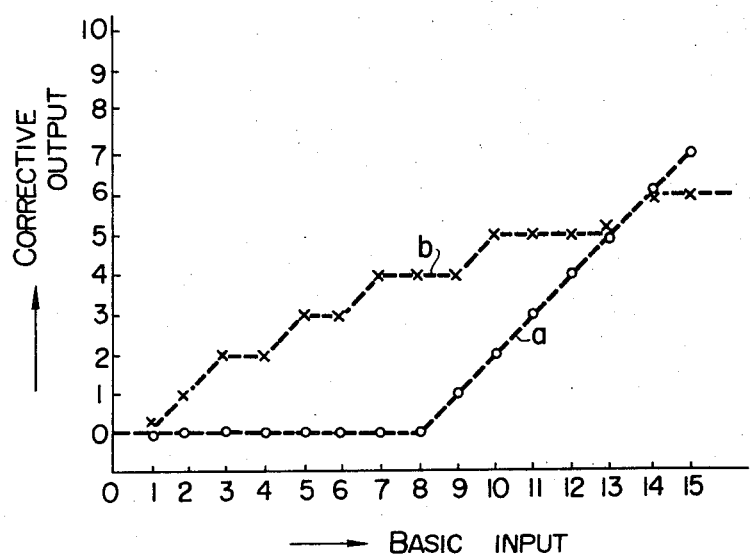
FIG. 3 is a characteristics diagram showing the relationship between the basic input to the matrix section of the present invention and the number of its output pulses.

Referring first to FIG. 2, assuming that the corrective digital quantity $B_1$ applied to the input terminal 1 is 5 and the basic input A 10, 5 in the binary form is stored in the register 11, while at the same time the binary 5 is converted into a hexadecimal number by the decoder 12 thereby to produce a high-level signal only at the terminal 5. This signal causes output signals to be generated at the eight output terminals of matrix section 13, thereby sampling the corrective digital data $B_1$, whereupon signals arrive at the eight input terminals $102a_1$, $102a_3$, $102a_5$, $102a_7$, $102a_9$, $102a_{11}$, $102a_{13}$ and $102a_{15}$ of the data selector 102 through the selector gate 101. Since the basic input A is 10, the date selector 102 repeats 10 selecting operations in response to the output of the counter circuit 111 as will be described later, whereby five pulses are produced at the output terminal 1021. When the basic input A changes from 10 to 15, eight pulses are produced at the output terminal 1021. On the other hand, if the basic input A is reduced to 5, three pulses are produced at the output terminal 1021. Further, when the corrective input $B_1$ changes from 5 to 15, six pulses are produced at the output terminal 1021 if the basic input A is 10. In this way, pulses depending upon the basic input A and corrective input $B_1$ appear at the output terminal 1021, as shown in the graph of FIG. 3. In this figure, the ordinate represents the number of output pulses appearing at the output terminal 1021, while the abscissa shows the basic input A. The curves a and b show the relationship between the basic and corrective inputs when the corrective input $B_1$ is 8 and 12 respectively.

The operation of the whole system including the circuit of FIG. 2 will be explained with reference to FIG. 1. The basic input A is applied through the selector gate 104 to the adder circuit 105. However, since no pulse has arrived at the counter circuit 103 and further a signal is applied to the input terminal $S_4$ of the selector gate 104, the result of addition in the adder circuit 105 is the same as the input A. This value $A_0$ is applied to the register 106 and further to registers 107 and 108 and is sequentially stored therein. The corrected quantities $B_{11}$, $B_{21}$ and $B_{31}$ which are the sampled results of the digital program quantities in accordance with the program of the program wing sections 10, 20 and 30 through the corrective inputs $B_1$, $B_2$ and $B_3$ are applied to the selector gate 101. Among these quantities, $B_{11}$ is selected to arrive at the input terminal 102a of the data selector 102 in a predetermined order. With the arrival of a high-level signal H at the set input terminal 1131 of R-S flip-flop 113, the high-level signal H appears at the output terminal 113a, so that the AND gate 110 is opened and the pulses from the input terminal 1101 are produced at the output terminal 1102 of the AND gate 110. These pulses are counted by the counter circuit 111, and when the counted result equals the information $A_0$ stored in the register 106, the high-level signal H is produced at the output terminal 112a of the comparator 112, whereupon the R-S flip-flop 113 is reversed, with the result that the output terminal 113a of R-S flip-flop 113 which is the input terminal of the AND gate 110 at the same time becomes a low L in signal level, thereby ceasing the generation of pulses at the output terminal 1102 of the AND gate 110. As a result, the counter circuit 111 stops its operation at this point. The signal from this counter circuit 111 is used to select the data selector 102 up to the value of basic input A. In the meantime, the number of pulses programmed in the matrix section 13 is produced at the output terminal 1021 of the data selector 102 as already explained, which pulses are counted by the counter circuit 103. The result of this counting operation is assumed to be $B_{1cor}$.

The information $A_0$ stored in the register 108 is selected by applying a signal to the input terminal $S_5$ of the selector gate 104 and is applied to the adder circuit 105, which produces the result $A_{01}$ of the addition "$B_{1cor} + A_0$" at its output terminal. This data is stored in the register 106, 107, 108 and 109. As in the case that the corrected quantity $B_{1cor}$ is produced by the programing section 10 in response to the corrective input $B_1$, application of the corrected quantity $B_{21}$ by means of the programing section 20 through the selector gate 101 to the data selector 102 causes this data selector 102 to perform the selecting operation up to $A_{01}$ stored in the register 106. The pulses thus selected are produced at the output terminal 1021 and counted by the counter circuit 103. Assuming that the counted result is $B_{2cor}$, the selector gate 104 selects the information $A_0 + B_{1cor}$ stored in the register 108 and applies it to the adder circuit 105, and therefore the adder circuit 105 produces at its output terminal the signal $A_0 + B_{1cor} + B_{2cor}$, i.e. the sum of $A_0 + B_{1cor}$ and $B_{2cor}$ which is the result obtained by the counter circuit 103.

The above explanation holds true also for the calculating operation for the corrective input $B_3$, in which the corrected quantity $B_3$ sampled by the programing section 30 is applied to the data selector 102. The output pulses resulting from the selection by the data selector 102 of the data "$A_0 + B_{1cor} + B_{2cor}$" are applied to the counter circuit 103, while the counted result $B_{3cor}$ of the counter circuit 103 is added to the data "$A_0 + B_{1cor} + B_{2cor}$" in the adder circuit 105, and the resultant data "$A_0 + B_{1cor} + B_{2cor} + B_{3cor}$" is stored in the register 109. In other words, a digital signal which is the result of correcting the basic input A by means of the corrective inputs $B_1$, $B_2$ and $B_3$ is stored in the register 109. This digital signal is used, for example, to determine the amount of fuel to be injected, in an electronic fuel injection system.

This invention is not limited to the embodiments illustrated above, but may take various forms. For example, the corrective inputs may be employed in any number. Also, the second and third corrections may be performed by $A_0$ instead of $A_0 + B_{1cor}$ and $A_0 + B_{1cor} + B_{2cor}$ respectively.

It will be understood from the above explanation that the digital data correcting system according to the invention comprises a first register for storing the basic digital input, a programing section including a second register for storing the corrective digital input, said programing section sampling the digital program data according to a predetermined program in response to the corrective digital input, and a data selector for picking up a digital program data corresponding to the basic digital input from among the digital program data sampled by the programing section, so that even if the function to be corrected is complicated, the corrected data of the basic digital input is obtained accurately by programming the system in advance such that the same function appears at the programing section.

Further, the provision of the adder circuit for adding the basic digital data to the digital program data selected by the data selector permits the use of the preceding sum as a basic digital input for the following corrective input even if more corrective inputs are employed. Thus not only the complication of calculating operations is eliminated but the fact that standardized circuits may be used simplifies and reduces the size of the system, resulting in a lower cost thereof. Further, the digital instead of analog operations facilitates the integration of circuits, thereby further reducing the size of the system.

I claim:

1. A digital data correcting system comprising a first register for storing a basic digital input, a programming section including a second register for storing a plurality of corrective digital inputs, said programming section including program means storing digital program data in accordance with a predetermined program, said programming section further including sampling means for sampling the digital program data in accordance with the predetermined program in response to said corrective digital inputs stored in said second register to form sampled digital program data, and a data selector means for selecting digital program data corresponding to said basic digital input from among the sampled digital program data sampled by said programming section.

2. A digital data correcting system comprising a first register for storing a basic digital input, a programming section including a second register for storing a plurality of corrective digital inputs, said programming section including program means storing digital program data in accordance with a predetermined program, said programming section further including sampling means for sampling the digital program data in accordance with the predetermined program in response to said corrective digital inputs stored in said second register to form sampled digital program data, a data selector means for selecting digital program data corresponding to said basic digital input from among the sampled digital program data sampled by said programming section and an adder circuit receiving inputs from said data selector means and said first register for adding said sampled digital program data which is selected by said data selector to said basic digital input.

* * * * *